(12) United States Patent
Theilemann

(10) Patent No.: US 10,294,899 B2
(45) Date of Patent: May 21, 2019

(54) GUIDE ELEMENT FOR A PRESSURE SYSTEM OF AN INTERNAL COMBUSTION ENGINE, PRESSURE SYSTEM FOR AN INTAKE TRACT OF AN INTERNAL COMBUSTION ENGINE, AND INTERNAL COMBUSTION ENGINE WITH A SUPERCHARGING UNIT

(71) Applicant: Dr. Ing. h.c. F. Porsche Aktiengesellschaft, Stuttgart (DE)

(72) Inventor: Ludwig Theilemann, Schoemberg-Schwarzenberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 36 days.

(21) Appl. No.: 15/433,138

(22) Filed: Feb. 15, 2017

(65) Prior Publication Data
US 2017/0234279 A1    Aug. 17, 2017

(30) Foreign Application Priority Data
Feb. 17, 2016   (DE) .................. 10 2016 102 769

(51) Int. Cl.
  *F02M 35/10* (2006.01)
  *F02B 37/00* (2006.01)
  *F02M 35/116* (2006.01)

(52) U.S. Cl.
  CPC ....... *F02M 35/10295* (2013.01); *F02B 37/00* (2013.01); *F02M 35/1165* (2013.01); *Y02T 10/144* (2013.01)

(58) Field of Classification Search
  CPC ......... F02M 35/10295; F02M 35/1165; F02M 35/1211; F02B 37/00; Y02T 10/144
  (Continued)

(56) References Cited

U.S. PATENT DOCUMENTS 1,853,838 A    4/1932  White
4,088,104 A *  5/1978  Ibbott .................... F02M 29/04
                                                        123/593

(Continued)

FOREIGN PATENT DOCUMENTS

AT    388 595         7/1987
FR    2422032 A1     11/1979
(Continued)

OTHER PUBLICATIONS

German Search Report dated Oct. 24, 2016.
(Continued)

*Primary Examiner* — Marguerite J McMahon
(74) *Attorney, Agent, or Firm* — Gerald E. Hespos; Michael J. Porco; Matthew T. Hespos

(57) ABSTRACT

A guide element for a pressure system of an internal combustion engine has a hollow body with a guide element inlet (27), a guide element outlet (28) and a longitudinal axis (26). The guide element (25) is designed so that flow can pass through it along its longitudinal axis (26). To eliminate disruptive oscillations, the guide element (25) is of streamlined form in a flow direction from the guide element inlet (27) to the guide element outlet (28). A pressure system for an intake tract of an internal combustion engine and an internal combustion engine with a supercharging unit also are provided.

23 Claims, 10 Drawing Sheets

(58) Field of Classification Search
USPC .......................................... 123/184.53, 590
See application file for complete search history.

(56) References Cited

U.S. PATENT DOCUMENTS

| | | | |
|---|---|---|---|
| 4,157,902 A | | 6/1979 | Tokar |
| 4,206,600 A | | 6/1980 | Feuling |
| 4,327,675 A | * | 5/1982 | Takeda ............... F02M 51/0675 |
| | | | 123/184.38 |
| 4,409,951 A | * | 10/1983 | Whitworth ............. F02M 29/04 |
| | | | 123/590 |
| 4,510,896 A | * | 4/1985 | Rutschmann ........... F02B 27/00 |
| | | | 123/184.34 |
| 4,848,281 A | | 7/1989 | McCord |
| 5,287,828 A | * | 2/1994 | Kennedy ................ F02M 19/10 |
| | | | 123/184.59 |
| 5,662,077 A | | 9/1997 | Boswell |
| 6,065,459 A | * | 5/2000 | Stevens ................... F02B 29/02 |
| | | | 123/590 |
| 6,336,471 B1 | | 1/2002 | Feuling |
| 7,942,139 B1 | | 5/2011 | Rockwell |
| 2008/0178831 A1 | * | 7/2008 | Enokida ........... F02M 35/10039 |
| | | | 123/184.61 |
| 2008/0308060 A1 | * | 12/2008 | Shigematsu ..... F02M 35/10039 |
| | | | 123/184.56 |
| 2009/0084336 A1 | | 4/2009 | Friedl |
| 2010/0101525 A1 | | 4/2010 | Now |
| 2010/0139604 A1 | | 6/2010 | Abdolhosseini |
| 2012/0328424 A1 | | 12/2012 | Berger et al. |
| 2016/0186652 A1 | * | 6/2016 | Musolesi ............... F02M 26/11 |
| | | | 123/561 |

FOREIGN PATENT DOCUMENTS

| | | |
|---|---|---|
| FR | 2 561 310 | 9/1985 |
| GB | 1302971 A | 1/1973 |
| GB | 1538728 A | 1/1979 |
| GB | 2021688 A | 12/1979 |
| JP | H055420 A | 1/1993 |
| JP | H0797927 A | 4/1995 |
| JP | 2001073895 A | 3/2001 |
| JP | 2009203850 A | 9/2009 |
| WO | 2008/023941 | 2/2008 |
| WO | 2008/032975 | 3/2008 |
| WO | 2009066836 A1 | 5/2009 |

OTHER PUBLICATIONS

British Search Report dated Jul. 3, 2017.
Japanese Notification of Reason for Rejection dated Jul. 10, 2018.

* cited by examiner

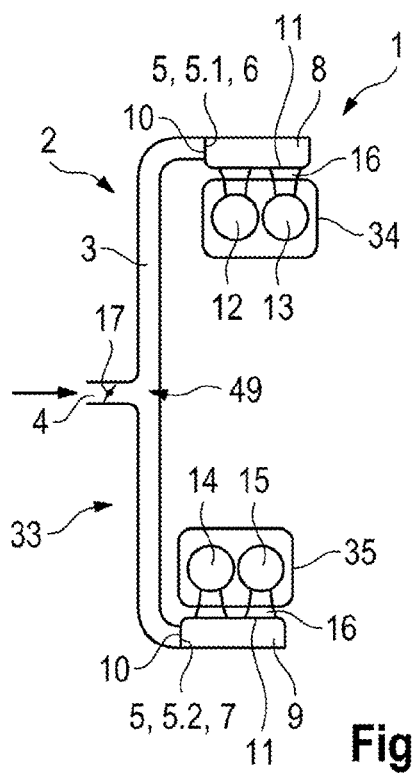
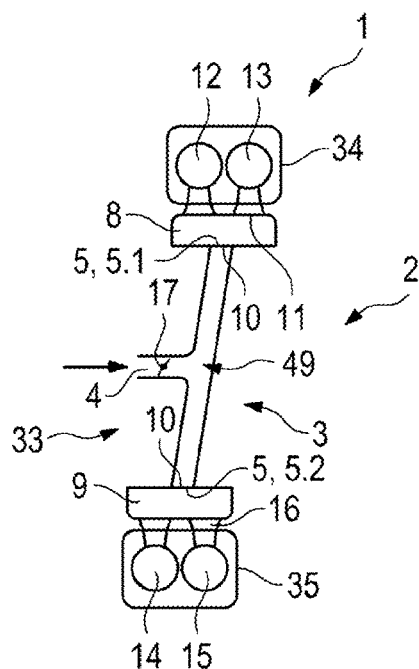
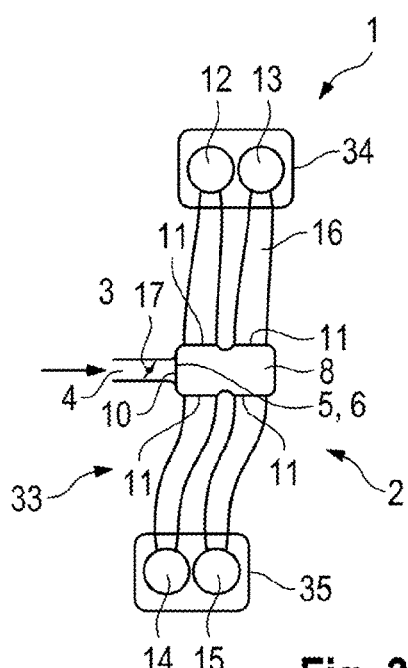

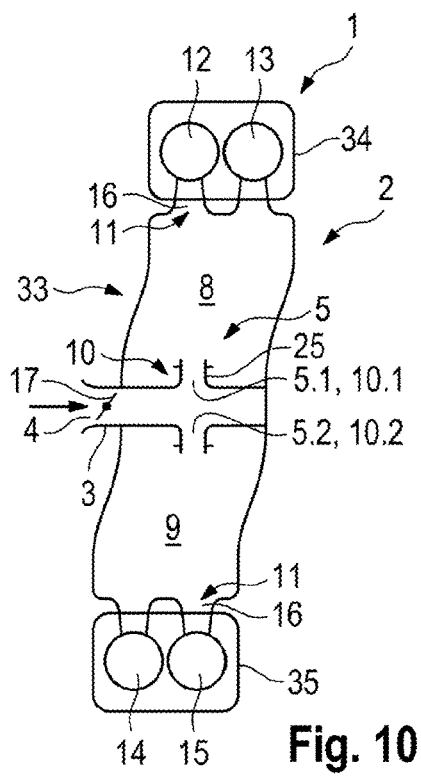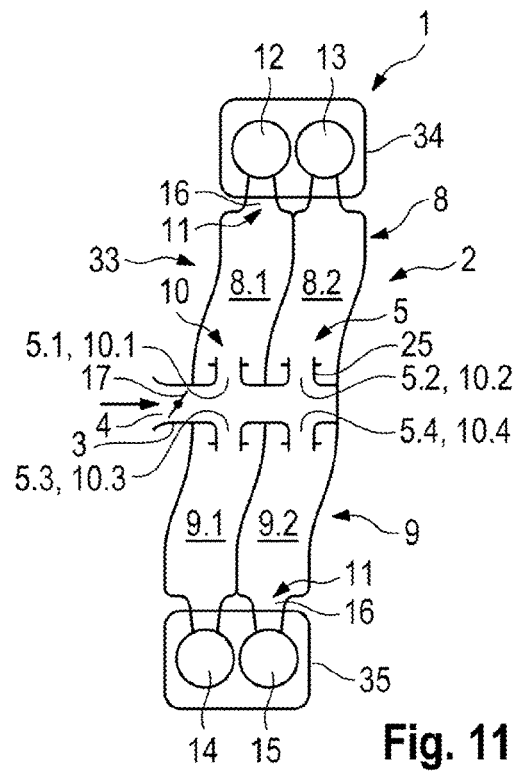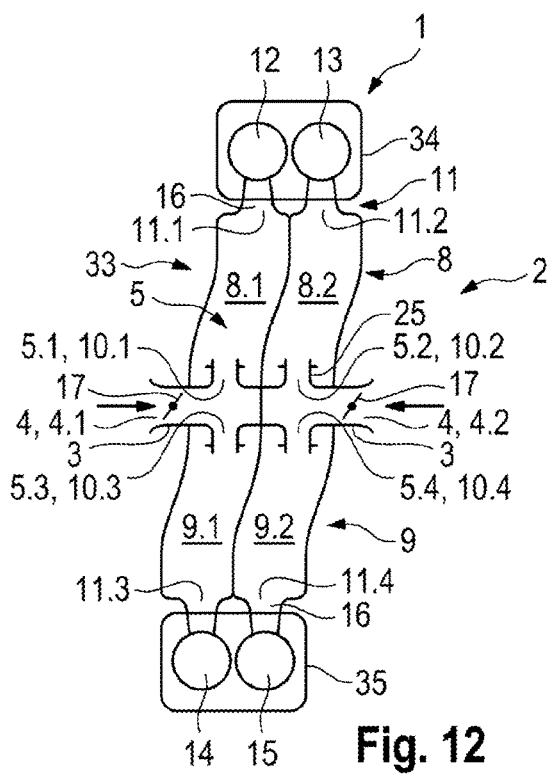

GUIDE ELEMENT FOR A PRESSURE SYSTEM OF AN INTERNAL COMBUSTION ENGINE, PRESSURE SYSTEM FOR AN INTAKE TRACT OF AN INTERNAL COMBUSTION ENGINE, AND INTERNAL COMBUSTION ENGINE WITH A SUPERCHARGING UNIT

CROSS REFERENCE TO RELATED APPLICATION

This application claims priority under 35 USC 119 to German Patent Appl. No. 10 2016 102 769.3 filed on Feb. 17, 2016, the entire disclosure of which is incorporated herein by reference.

BACKGROUND

1. Field of the Invention

The invention relates to a guide element for a pressure system of an internal combustion engine, to a pressure system for an intake tract of an internal combustion engine, and to an internal combustion engine with a supercharging unit.

2. Description of the Related Art

An internal combustion engine comprises cylinders, combustion chambers assigned to the cylinders, an intake tract and an exhaust tract. The intake tract functions to supply an air quantity or an air-fuel quantity into the combustion chambers. The exhaust tract functions to discharge the burned air-fuel quantity from the combustion chambers. The intake tract has a pressure system that distributes the drawn-in air or air-fuel quantity to the individual combustion chambers.

Pressure oscillations occur in the intake tract and exhaust tract due to the opening and closing of the combustion chambers. These pressure oscillations have a great influence on a charge exchange of the internal combustion engine. Guide elements, normally in the form of pulsation dampers, are used to reduce pressure oscillations.

For example, U.S. Pat. No. 4,848,281 discloses an internal combustion engine with a pulsation damper upstream of each inlet valve and downstream of each outlet valve in a cylinder head of the internal combustion engine. The pulsation dampers are in the form of integral constituent parts of an inlet duct having the inlet valve, and of an outlet duct, having the outlet valve. The pulsation dampers are designed to allow a gaseous flow medium in the form of a fuel-air mixture to pass through unchanged when the valves are open. If the valves are closed, a backflow occurs from the corresponding valve into the pulsation dampers counter to the original flow directions that prevailed when the valves were open.

WO 2008/032975 discloses a pulsation damper in an intake tract of an internal combustion engine. The pulsation damper has a Venturi-nozzle-like shape. Passage openings are formed in the region of the smallest diameter of the pulsation damper for the inflow of backflowing flow medium into the pulsation damper. A damper outlet diameter corresponds substantially to a damper inlet diameter of the pulsation damper.

The disclosed guide elements function for damping and reducing the pressure oscillations that exist in the intake tract. However, to increase the power of the internal combustion engine it is necessary not only to realize an even distribution of cylinder charges of the cylinders of the internal combustion engine, but also to avoid a so-called follow-up charging effect in the case of internal combustion engines in the form of Otto-cycle engines. This may be realized by a guide element that eliminates disruptive oscillations in a pressure system of the intake tract of the internal combustion engine and, due to this eliminating action, may also be referred to as a depulsor.

It is thus an object of the invention to provide a guide element for a pressure system of an internal combustion engine. It is a further object of the invention to specify an improved pressure system for an intake tract of an internal combustion engine and an improved internal combustion engine with a supercharging unit.

SUMMARY

A guide element for a pressure system of an internal combustion engine in accordance with the invention has a guide element inlet and a guide element outlet. The guide element is a hollow body so that flow can pass through the guide element along its longitudinal axis. To eliminate disruptive oscillations, the guide element is of streamlined form in a flow direction proceeding from the guide element inlet to the guide element outlet. Streamlined means that the guide element has no discontinuities, and the air or air-fuel quantity flowing through the guide element, is opposed by no resistance, or by only a low resistance due to the shape of the guide element, in particular at the guide element inlet. In the installed state, the guide element outlet should be positioned to face toward the internal combustion engine, and the guide element inlet should be positioned to face away from the internal combustion engine. It is thus possible for the air or air-fuel quantity to flow in the direction of the internal combustion engine without a significant throttling action.

In one embodiment, the guide element is of non-streamlined form in a flow direction proceeding from the guide element outlet to the guide element inlet. Non-streamlined means that the greatest possible throttling action, to the point of complete or substantial elimination of the charge pressure oscillations incited by the cylinders drawing in air, can be effected. In a simple case, this is realized by a non-flush form of the guide element outlet with a flow inlet opening that receives the guide element outlet. The flow inlet opening may be formed in a collector tank of the internal combustion engine or in a distributor pipe of the pressure system. Thus, the guide element outlet is formed to be smaller than the flow inlet opening that receives the guide element outlet.

The guide element may be of funnel-shape, and may be in the form of a feed hopper. More particularly, the guide element may project with its guide element outlet into the flow inlet opening, thereby defining a non-flush form that protrudes with a sharp edge, for the greatest possible throttling action.

A guide element inlet diameter of the guide element may be larger than a guide element outlet diameter of the guide element. In this way, it is possible in a simple manner to realize a streamlined form in a flow direction proceeding from the guide element inlet in the direction of the guide element outlet.

The guide element may have a support element for fastening in the pressure system. Thus, the guide element can be produced independently of the pressure system, in particular of the distributor pipe so that the guide element can be used in a variable manner. In other words, it the guide element can be installed at different positions in the pressure system. A further advantage is that the guide element can, with the aid of the support element, be used in different pressure systems. In other words, the guide element can have the same design for different pressure systems, and the support element is designed in a manner dependent on the pressure system. It is thus possible for the guide element to be produced inexpensively in large unit quantities and to nevertheless be installed in different pressure systems, because the support element of the pressure system is designed in an adapted manner.

In a further refinement of the guide element, the support element is formed to extend radially away from the longitudinal axis proceeding from an outer edge formed on the guide element inlet. An advantage of this embodiment is possible positioning of the support element substantially outside the air or air-fuel flow, in such a way that the air or air-fuel flow is not influenced. Additionally, the support element enables a flush and streamlined installation of the guide element.

The invention also relates to a pressure system for an intake tract of an internal combustion engine. The pressure system has a distributor pipe, through which flow can pass. The distributor pipe has a flow inlet and a flow outlet. A collector tank of the pressure system is arranged at the flow outlet and has a tank inlet connected so that flow can pass through to the flow outlet. The collector tank has a tank outlet that is connected so that flow can pass through to a cylinder of the internal combustion engine, by way of a primary pipe of the pressure system through which flow can pass. In order to eliminate disruptive oscillations, the above-described guide element may be formed in the pressure system between the flow inlet and the primary pipe. This pressure system enables a substantially equal charging of cylinders of the internal combustion engine and also avoids a compression of the air or air-fuel quantity and a corresponding undesired temperature increase of the air or air-fuel quantity. Such a temperature increase leads to an uncontrolled combustion in the case of high levels of supercharging of the internal combustion engine, and leads to so-called knocking in the case of an internal combustion engine in the form of an Otto-cycle engine.

The guide element may be arranged at the flow outlet of the distributor pipe or between the flow inlet and the flow outlet of the distributor pipe, downstream of a branching point of the distributor pipe.

To eliminate the disruptive oscillations, a guide element outlet of the guide element may have a guide element outlet diameter that is smaller than a distributor pipe diameter at the flow inlet of the distributor pipe.

In the case of an internal combustion engine in the form of an Otto-cycle engine that has a throttle flap with a throttle flap diameter downstream of the flow inlet and upstream of the guide element, it has proven effective for the guide element outlet to have a guide element outlet diameter that is smaller than the throttle flap diameter.

Disruptive oscillations have been proven to be eliminated effectively if the guide element outlet diameter has a value of at least 0.3 times the diameter at the flow inlet of the distributor pipe and at most 0.5 times the diameter at the flow inlet of the distributor pipe, or, if a throttle flap is provided, for the guide element outlet diameter to have a value of at least 0.3 times the throttle flap diameter and at most 0.5 times the throttle flap diameter. This embodiment may be selected in the case of four guide elements being used in the pressure system, wherein in each case two guide elements are assigned to one bank of the internal combustion engine.

The invention also relates to an internal combustion engine with a supercharging unit, having an intake tract with a first bank and a second bank. The first bank may have at least two cylinders and the second bank may have at least two further cylinders. The intake tract has a pressure system comprising a distributor pipe, a first collector tank and a second collector tank. The first collector tank may be assigned to the first bank and the second collector tank may be assigned to the second bank. Primary pipes of the pressure system for the flow through the cylinders may be formed between the cylinders of the first bank and the first collector tank and between the further cylinders of the second bank and the second collector tank. The pressure system may be configured as described above. The flow outlet of the distributor pipe of the pressure system may have at least one first flow outlet opening connected to the first collector tank so that flow can pass through, and the flow outlet may have at least one second flow outlet opening connected to the second collector tank so that flow can pass through.

The internal combustion engine of the invention exhibits low charge exchange work so that low fuel consumption can be achieved. Furthermore, considerably lower temperatures of the cylinder charge are achieved. Thus, it is possible to achieve an increase of a charge pressure in the case of an internal combustion engine in the form of a diesel engine, and it is possible in the case of an internal combustion engine in the form of an Otto-cycle engine to reduce the knocking tendency and to set an ignition time of the internal combustion engine to effect an increase in efficiency.

The pressure system may have four depulsors, namely two depulsors per cylinder bank. Thus, the torque can be achieved with lower fuel consumption due to a lower air throughput.

The pressure system of the invention enables the compressor of an internal combustion engine that has an exhaust-gas turbocharger to be operated with greater efficiency in an upper engine speed range of the internal combustion engine as compared to an internal combustion engine without the pressure system of the invention.

A further positive effect is a reduction of an exhaust-gas temperature due to a shift of the ignition time in the direction of the so-called top dead center of the cylinder during a compression phase. In this way, temperatures of those components of the internal combustion engine through which exhaust gas flows are reduced, and it is possible to avoid the conventional component protection measures, such as an enrichment of the air-fuel mixture.

Further advantages, features and details of the invention will emerge from the following description of preferred exemplary embodiments and from the drawing. The above features and feature combinations mentioned in the description and the features and feature combinations mentioned below in the description of the figures and/or shown in the figures alone may be used not only in the respectively specified combination but also in other combinations or individually without departing from the scope of the invention. Identical or functionally identical elements are denoted by identical reference designations.

BRIEF DESCRIPTION OF THE DRAWINGS

FIG. 1 is a schematic illustration of an internal combustion engine with a pressure system according to the prior art, in a first variant.

FIG. 2 is a schematic illustration of the internal combustion engine with the pressure system according to the prior art, in a second variant.

FIG. 3 is a schematic illustration of the internal combustion engine with the pressure system according to the prior art, in a third variant.

FIG. 10 is a schematic illustration of the internal combustion engine according to the invention with the pressure system according to the invention in a second exemplary embodiment.

FIG. 11 is a schematic illustration of the internal combustion engine according to the invention with the pressure system according to the invention in a third exemplary embodiment.

FIG. 12 is a schematic illustration of the internal combustion engine according to the invention with the pressure system according to the invention in a fourth exemplary embodiment.

DETAILED DESCRIPTION

Figure 4:
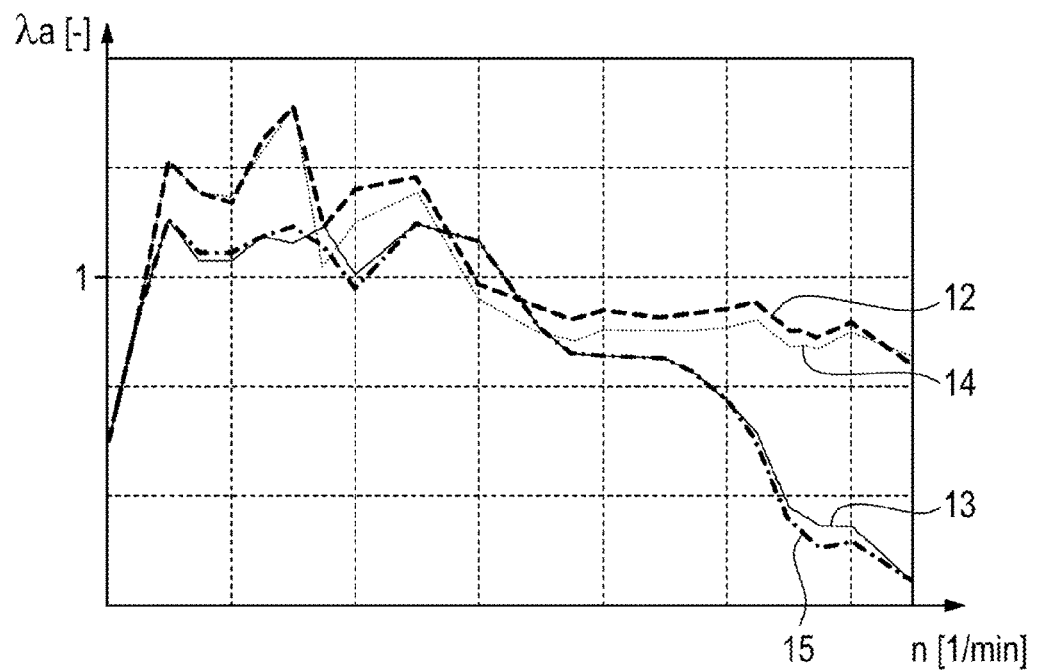
FIG. 4 shows, in a $\lambda_a$-n diagram, curves of the volumetric efficiency of individual cylinders of the internal combustion engine as per FIG. 2.

An internal combustion engine 1 with an intake tract 2, having a pressure system 33 according to the prior art, is shown in FIG. 1. The pressure system 33 comprises a distributor pipe 3 through which flow can pass and which has a flow inlet 4 and a flow outlet 5, wherein the flow inlet 4 is positioned centrally on the distributor pipe 3, and, downstream of the flow inlet 4, the distributor pipe 3 has a branching point such that the distributor pipe 3 is, in effect, of T-shaped form, and the flow outlet 5 is formed at a first end 6 of the distributor pipe 3 and at a second end 7 of the distributor pipe 3.

The flow outlet 5 of the first end 6 has a first flow outlet opening 5.1 connected so that flow can pass through to a first collector tank 8 of the pressure system 33. Likewise, the flow outlet 5 of the first end 7 has a second flow outlet opening 5.2 connected so that flow can pass through to a second collector tank 9 of the pressure system 33. Each collector tank 8, 9 has a tank inlet 10 and a tank outlet 11 for the passage of flow.

The internal combustion engine 1 is in the form of a so-called boxer engine and has a first cylinder 12, a second cylinder 13, a third cylinder 14 and a fourth cylinder 15. The first cylinder 12 and the second cylinder 13 are arranged to be situated opposite the third cylinder 14 and the fourth cylinder 15. In other words, the first cylinder 12 and the second cylinder 13 form a first bank 34, and the third cylinder 14 and the fourth cylinder 15 form a second bank 35.

Each of the cylinders 12, 13, 14, 15 is connected so that flow can pass through, in each case, to one primary pipe 16 of the pressure system 33. The end of the primary pipe that faces toward the cylinder 12, 13, 14, 15 is connected so that flow can pass through to an inlet duct of a cylinder head of the internal combustion engine 1. The distributor pipe 3 has a throttle flap 17 downstream of its flow inlet 4 and upstream of its flow outlet 5.

The internal combustion engine 1 could likewise be in the form of a so-called V-configuration engine.

FIG. 2 illustrates the internal combustion engine 1 with the pressure system 33 of the prior art, in a second variant. The difference between the first variant and the second variant of the pressure system 33 can be seen in the fact that the first collector tank 8 and the second collector tank 9 of the second variant are arranged to face toward one another, between the banks 34, 35, whereas the first collector tank 8 and the second collector tank 9 of the first variant are formed to face away from one another, wherein the banks 34, 35 are positioned between the collector tanks 8, 9.

Figure 6:
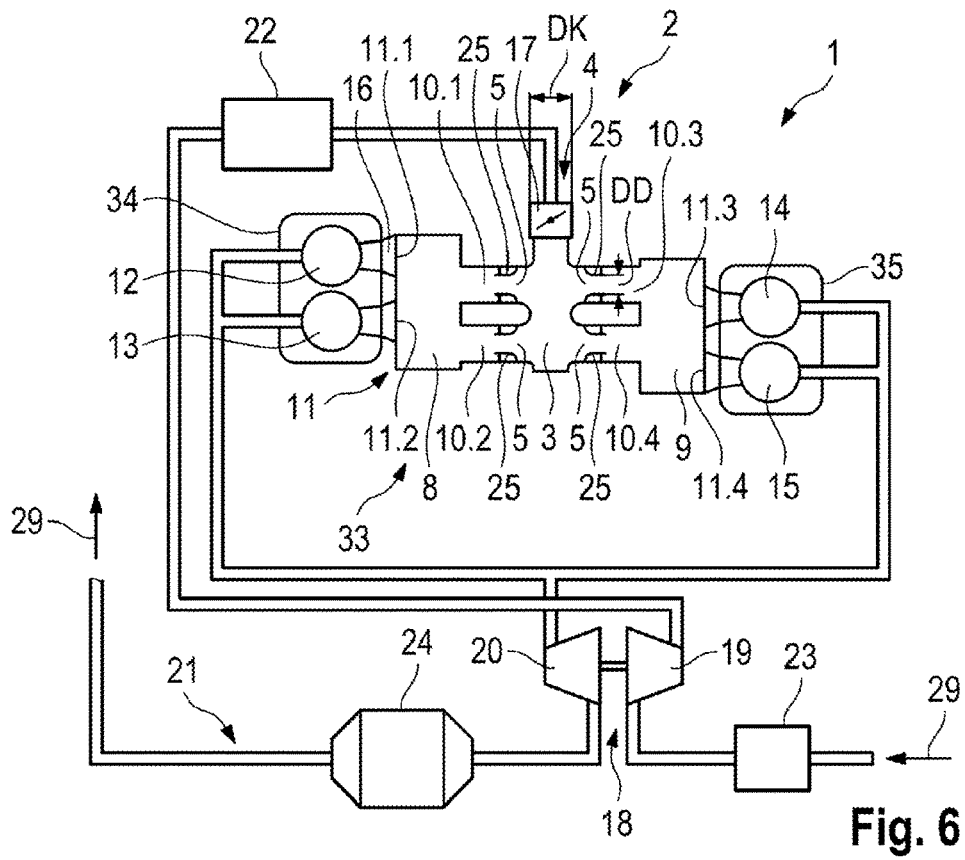
FIG. 6 is a schematic illustration of an internal combustion engine according to the invention with a pressure system according to the invention in a first exemplary embodiment.

In conjunction with an exhaust tract 21 of the internal combustion engine 1, see FIG. 6, this means that the exhaust tract 21 of the first variant is arranged between the first bank 34 and the second bank 35, whereas, in the second variant, the exhaust tract is formed to at least partially surround the first bank 34 and the second bank 35.

The prior art pressure system 33 of the internal combustion engine 1 is illustrated in a third variant in FIG. 3. In the third variant, the pressure system 33 has a single collector tank 8. The primary pipes 16 assigned to the respective cylinders 12, 13, 14, 15 are of long form in relation to the primary pipes 16 of the first and second variants.

The primary pipes 16 of the first variant and of the second variant have the effect, in the case of an ignition sequence in which the mutually adjacently arranged cylinders 12, 13; 14, 15 are ignited in succession, for example in the ignition sequence 1-4-3-2, that a gaseous pressure column formed in the distributor pipe 3 oscillates at half of an induction frequency. Thus, different gas quantities are present in the cylinders 12, 13, 14, 15. This is illustrated by way of example in FIG. 4. FIG. 4 illustrates, in a $\lambda$a-n diagram, curves of the volumetric efficiency $\lambda$a [–] of the cylinders 12, 13, 14, 15 of the internal combustion engine 1 with a supercharging unit 18 in the form of an exhaust-gas turbocharger according to the prior art versus an engine speed n [rpm].

Figure 5:
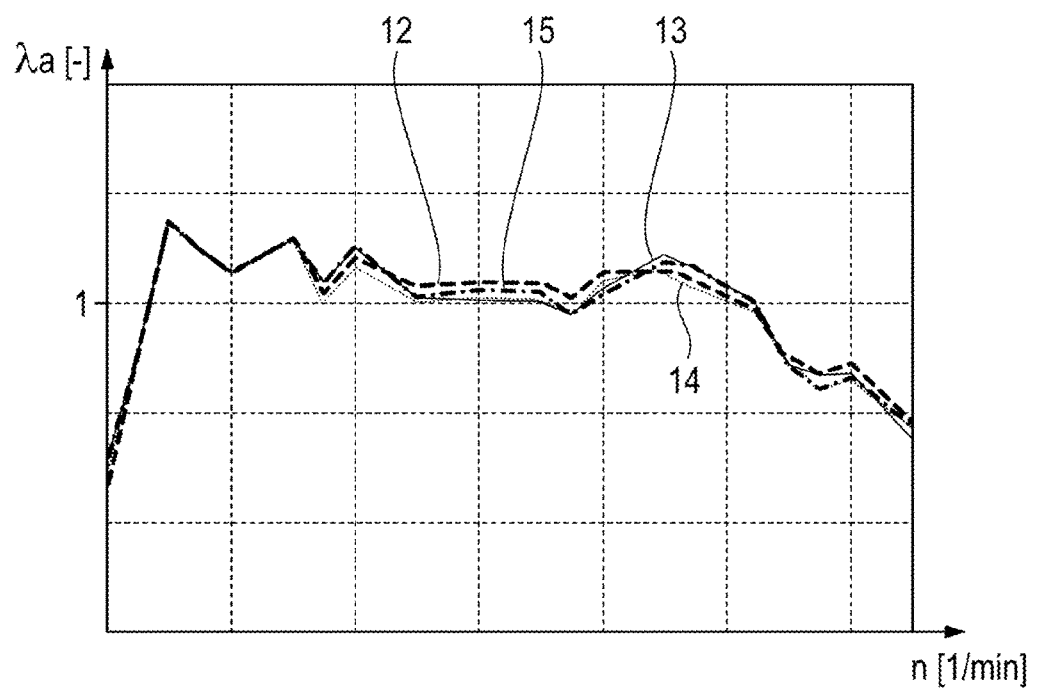
FIG. 5 shows, in a $\lambda_a$-n diagram, curves of the volumetric efficiency of individual cylinders of the internal combustion engine as per FIG. 3.

In comparison therewith, FIG. 5 illustrates curves of the volumetric efficiency $\lambda$a [–] of the cylinders 12, 13, 14, 15 of the internal combustion engine 1 as per FIG. 3, that is to say with long primary pipes 16. The illustrated curves of the volumetric efficiency $\lambda$a show that cylinder charges of the individual cylinders 12, 13, 14, 15 are substantially equal, with small deviations existing due to different pipe forms, for example pipe bends of the primary pipes 16 and inexact symmetry of the exhaust tract 21. The deviations are however negligible. The volumetric efficiency $\lambda$a is problematic in the case of a value considerably greater than 1. This is characteristic of a so-called follow-up charging effect and increases the knocking tendency of the internal combustion engine 1 of the prior art so that ignition times of the cylinders 12, 13, 14, 15 within a working cycle of the internal combustion engine 1 must be shifted in the direction of an outlet opening time of an outlet valve of the internal combustion engine 1, and thus in a retarding direction. This shift normally reduces an efficiency $\eta$ of the internal combustion engine 1, and a fuel consumption of the internal combustion engine 1 is increased.

Basically, the so-called short primary pipes 16 in the first variant and the second variant are desirable, because, owing to their short length, they prevent the follow-up charging effect in the internal combustion engine 1 with the exhaust-gas turbocharger 18. The follow-up charging effect effects an additional compression of the cylinder charge so that the cylinder charge is heated more. This leads to an increase in a knocking tendency of the internal combustion engine 1.

FIG. 6 shows, in a schematic illustration, an internal combustion engine 1 according to the invention with a pressure system 33 according to the first embodiment. The internal combustion engine 1 is assigned the supercharging unit 18 in the form of the exhaust-gas turbocharger, and a compressor 19 of the exhaust-gas turbocharger 18 is positioned in the intake tract 2 upstream of the throttle flap 17 with a throttle flap diameter DK and a turbine 20 is positioned downstream of the cylinders 12, 13, 14, 15 in the exhaust tract 21 of the internal combustion engine 1. For the cooling of fresh air that is drawn in and compressed by way of the compressor 19, a charge-air cooler 22 is arranged in the intake tract 2 between the throttle flap 17 and the compressor 19. An air filter 23 for filtering the drawn-in fresh air is provided in the intake tract 2 upstream of the compressor 19. It would likewise also be possible for the supercharging unit 18 to be in the form of a mechanical charger, for example in the form of a so-called screw-type compressor. It is likewise possible for the supercharging unit 18 to be of some other form that increases the charge pressure of the internal combustion engine 1.

An exhaust-gas aftertreatment unit 24 is provided for the reduction of exhaust-gas emissions is positioned in the exhaust tract 21 downstream of the turbine 20. A silencer for reducing the noise emissions of exhaust gas emerging via the exhaust tract 21 is integrated into the exhaust-gas aftertreatment unit 24. The silencer also may be arranged in the exhaust tract 21 downstream of the exhaust-gas aftertreatment unit 24. The pressure system 33 according to the invention has four guide elements 25 according to the invention, or depulsors.

In this exemplary embodiment, each cylinder 12, 13, 14, 15 is assigned in each case one guide element 25. The guide elements 25 are arranged at the flow outlet 5 of the distributor pipe 3. Thus the distributor pipe 3 has a first flow outlet opening 5.1, a second flow outlet opening 5.2, a third flow outlet opening 5.3 and a fourth flow outlet opening 5.4.

The guide elements 25 are connected so that flow can pass through to the collector tanks 8, 9. Thus, the first collector tank 8 has two tank inlet openings, a first tank inlet opening 10.1 and a second tank inlet opening 10.2, and the second collector tank 9 likewise has two tank inlet openings, a third tank inlet opening 10.3 and a fourth tank inlet opening 10.4. Each tank inlet opening 10.1, 10.2, 10.3, 10.4 is assigned, upstream, in each case one guide element 25.

The collector tanks 8, 9, at their tank outlet 11 in each case, are connected, such that flow can pass through, by way of the primary pipes 16 to the cylinders 12, 13, 14, 15. Thus, the first cylinder 12, by way of the primary pipe 16 assigned thereto, is connected so that flow can pass through to the first collector tank 8 by way of the first tank outlet opening 11.1 thereof. The second cylinder 13, by way of the primary pipe 16 assigned thereto, is connected so that flow can pass through to the first collector tank 8 by way of the second tank outlet opening 11.2 thereof. The third cylinder 14, by way of the primary pipe 16 assigned thereto, is connected so that flow can pass through to the second collector tank 9 by way of the third tank outlet opening 11.3 thereof. Finally, the fourth cylinder 15, by way of the primary pipe 16 assigned thereto, is connected so that flow can pass through, to the second collector tank 9 by way of the fourth tank outlet opening 11.4 thereof.

Figure 7:
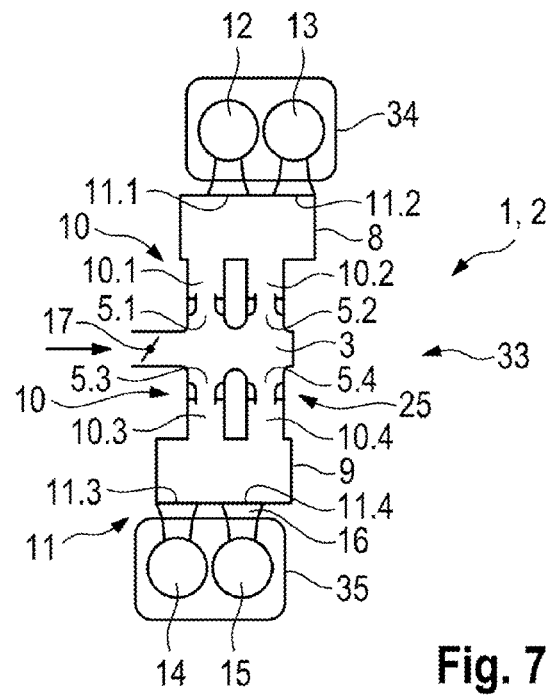
FIG. 7 is a schematic illustration of the internal combustion engine according to the invention with the pressure system according to the invention as per FIG. 6.

FIG. 7 shows, in a simplified schematic illustration, the internal combustion engine 1 of the invention with the pressure system 33 of the invention as in FIG. 6. A collector volume formed between the guide elements 16 and a cylinder head flange of the banks 34, 35, and thus between an end, formed so as to face toward the bank 34, 35, of the primary pipe 16 and the guide element outlet 28, corresponds approximately to a swept volume of the internal combustion engine 1.

Figure 8:
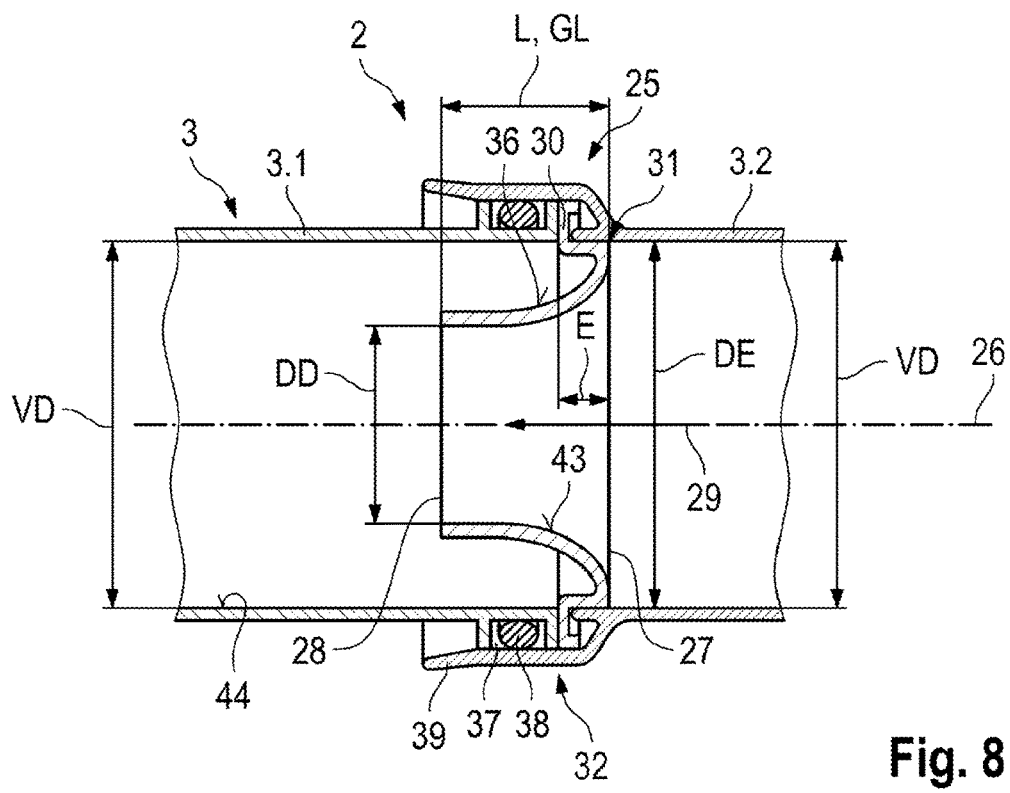
FIG. 8 shows, in a longitudinal section, a guide element according to the invention in an exemplary first embodiment.

The guide element 25 of a first embodiment of the invention is designed as in FIG. 8. The guide element 25 has a longitudinal axis 26, a guide element inlet 27 and a guide element outlet 28. The guide element inlet 27 and the guide element outlet 28 are spaced part by a length L of the guide element 25. A total length GL of the guide element 25 may, though need not imperatively, correspond to the length L, because the length L is a length of the guide element 25 through which flow can pass.

To eliminate disruptive oscillations, the guide element 25 is of streamlined form, preferably of funnel-like form as illustrated in this exemplary embodiment, in particular in the form of a feed hopper, in a flow direction, see arrow 29, proceeding from the guide element inlet 27 to the guide element outlet 28. In the direction proceeding from the guide element outlet 28 to the guide element inlet 27, which is opposite to the arrow 29, the guide element 25 is of non-streamlined form. A guide element inlet diameter DE of the guide element inlet 27 is larger than a guide element outlet diameter DD of the guide element outlet 28.

The guide element 25 may be installed in an effective manner at two different locations in the pressure system 33. The first location is at the flow outlet 5 of the distributor pipe 3. Here, the corresponding flow outlet opening 5.1; 5.2; 5.3; 5.4 is formed to adjoin the guide element inlet 27 or to receive the latter. The guide element outlet 28 is positioned at the tank inlet 10 so as to project into the corresponding tank inlet opening 10.1; 10.2; 10.3; 10.4.

The second location is in the distributor pipe 3 between the flow outlet 5 and the flow inlet 4, preferably in the region of the branching point 49. Here, the distributor pipe 3 has an interface 32 over its cross section, into which interface the guide element 25 is inserted.

The selection of the location is dependent on the overall construction of the pressure system 33, as described below in the further exemplary embodiments of the internal combustion engine 1 according to the invention.

The guide element 25 illustrated in FIG. 8 is positioned in the distributor pipe 3 between the flow inlet 4 and the flow outlet 5. At the guide element inlet 27, the guide element 25 is connected in pressure-tight fashion so that flow can pass through to the distributor pipe 3. The guide element inlet diameter DE corresponds substantially to a distributor pipe diameter VD. Thus, it is possible to realize a streamlined shape of the guide element 25 in a flow direction of arrow 29.

At the guide element outlet 28, the guide element 25 is connected in pressure-tight fashion, so that flow can pass through, either to the distributor pipe 3, as illustrated in FIG. 8, or to the tank inlet 10, depending on the selected location. The guide element 25 described below could likewise be formed at the tank inlet 10.

The guide element 25 has a support element 30 in the region of the guide element inlet 27. The support element 30 is on a casing 36 of the guide element 25 that is to be received in the interface 32 that divides the distributor pipe 3 into a first pipe section 3.1 and a second pipe section 3.2. The support element 30 fully surrounds the guide element 25 over the circumference thereof. More particularly, the support element 30 is of ring-shaped form and, in the illustrated first embodiment, has an L-shaped cross section and extends to project out around the guide element inlet 27.

The support element 30 extends substantially radially out from the longitudinal axis 26 proceeding from an outer edge 31 at the guide element inlet 27 and extends axially over an element length E proceeding from the outer edge 31 in the direction of the guide element outlet 28. The axial extent serves for sealingly receiving the guide element 25 in the distributor pipe 3.

The first pipe section 3.1 extends over the guide element outlet 28 in the direction of the guide element inlet 27 and has a groove 37 on its outer circumference on its end facing toward the support element 30. A sealing element 38 in the form of an O-ring is arranged in the groove 37. This is necessary because the guide element outlet diameter DD is smaller than a distributor pipe diameter VD of the distributor pipe 3. Therefore, in the event of a backflow of the fuel-air mixture via the guide element outlet 28 in the direction of the guide element inlet 27, the fuel-air mixture cannot escape from the distributor pipe 3 via the interface 32.

The gas-tight fastening of the guide element 25 in the distributor pipe 3 is secured by way of a pipe collar 39 that is formed on the second pipe section 3.2 to extend in the direction of the first pipe section 3.1 and that receives and surrounds the support element 30 and the first pipe section 3.1 in the region of the groove 37.

If the guide element 25 is arranged at the flow outlet 5 of the distributor pipe 3, the first pipe section 3.1 corresponds to the tank inlet 10 and the second pipe section 3.2 corresponds to the flow outlet 5.

Figure 9:
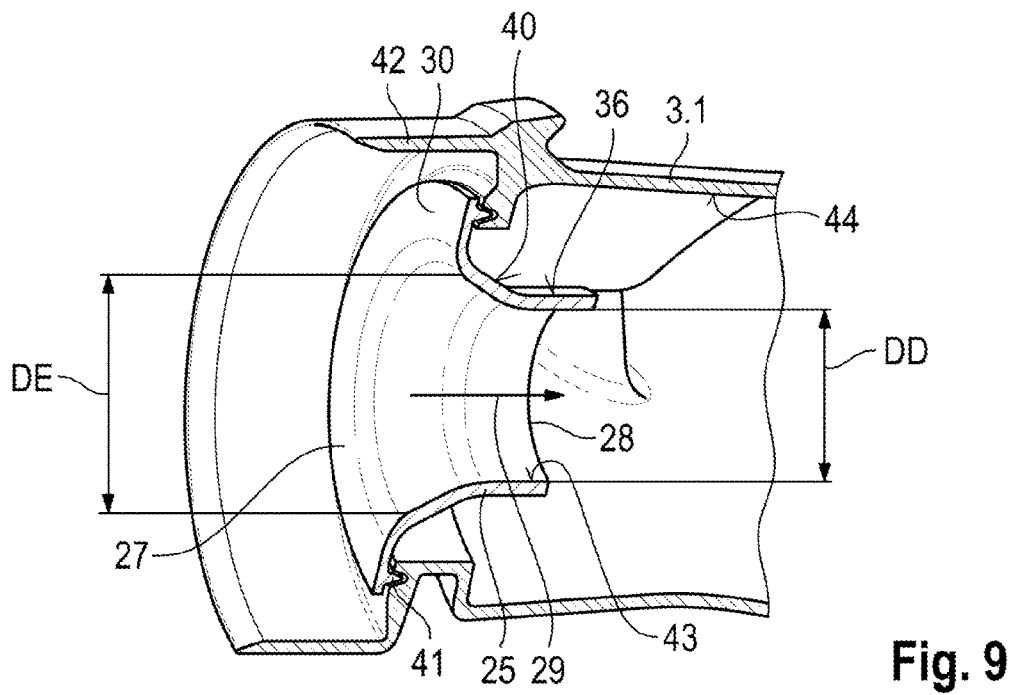
FIG. 9 shows, in a longitudinal section, the guide element according to the invention in an exemplary second embodiment.

The guide element 25 according to a second embodiment of the invention is designed according to FIG. 9. The support element 30 is of ring-shape and has, on its element surface 40 formed so as to face towards the guide element outlet 28, a ring-shaped protuberance 41 that is formed to produce a sealed connection to a further support element 42. The further support element 42 is in the form of a pipe flange, and is designed to concentrically receive and surround, the guide element 25. The further support element 42 is formed integrally with the distributor pipe 3 or the first pipe section 3.1. The further support element could also be formed as an individual component configured to achieve a pressure-tight connection to the pipe sections 3.1, 3.2.

The guide element 25 has its non-streamlined form owing to its element inner contour 43, which is not designed to run flush, or to terminate flush, with a pipe inner contour 44 of the first pipe section 3.1. Since the guide element outlet diameter DD is smaller than the distributor pipe diameter VD at the guide element outlet 28, or the tank inlet diameter 10.1, 10.2, 10.3, 10.4 at the guide element outlet 28, a throttling action counter to the flow direction of the flow direction arrow 29 is realized. The guide element outlet 28 is preferably of sharp-edged form. The guide element 25 also is referred to as depulsor owing to its use for breaking up a charge-air oscillation incited by the cylinders 12, 13, 14, 15 respectively in the intake stroke.

In accordance with the level of supercharging of the internal combustion engine 1 and the collector volume, the guide element outlet diameter DD should preferably be selected as follows: $0.3*DK < DD < 0.5*DK$.

FIGS. 10 to 16 are schematic illustrations of the internal combustion engine according to the invention with the pressure system 33 according to the invention in various exemplary embodiments. To avoid a lack of clarity, FIGS. 10 to 12 and 16 illustrate the reference lines of the flow outlet openings 5.1, 5.2, 5.3, 5.4 together with the reference lines of the tank inlet openings 10.1, 10.2, 10.3, 10.4. It is pointed out that the guide elements 25 are designed to project into the tank inlet openings 10.1, 10.2, 10.3, 10.4.

The pressure system 33 according to a second embodiment of the invention is designed as in FIG. 10. The first bank 34 is assigned to the first collector tank 8 and the second bank 25 is assigned to the second collector tank 9. The primary pipes 16 connect the collector tanks 8, 9 to the cylinders 12, 13, 14, 15 so that flow can pass through and are, in each case, of short form. The distributor pipe 3 has, at its flow outlet 5, the first flow outlet opening 5.1 connected to the first collector tank 8 so that flow can pass through, and the second flow outlet opening 5.2 that is connected to the second collector tank 9 so that flow can pass through. The guide element 25 assigned to the first collector tank 8 is arranged at the first flow outlet opening 5.1, and the guide element 25 assigned to the second collector tank 9 is positioned at the second flow outlet opening 5.2. This second exemplary embodiment has, due to an enlarged collector tank volume in relation to the first exemplary embodiment, an action similar to a ram supercharging arrangement. In other words, pressure pulsations are reduced due to the large collector tank volumes. For this second exemplary embodiment, the guide element outlet diameter DD should preferably be selected as follows: $0.3*DK<0.7*DD<0.5*DK$.

FIG. 11 illustrates the pressure system 33 according to the invention in a third embodiment. In this embodiment, the collector tanks 8, 9 assigned to in each case one bank 34, 35 are divided into in each case two bank collector tanks, such that each cylinder 12, 13, 14, 15 is assigned a bank collector tank 8.1, 8.2, 9.1, 9.2. The distributor pipe 3 has two flow outlet openings per bank 34, 35, wherein the first bank collector tank 8.1 is assigned the first flow outlet opening 5.1, the second bank collector tank 8.2 is assigned the second flow outlet opening 5.2, the third bank collector tank 8.3 is assigned the third flow outlet opening 5.3, and the fourth bank collector tank 8.4 is assigned the fourth flow outlet opening 5.4.

This third exemplary embodiment yields a further reduction in consumption of the internal combustion engine 1 in relation to the first exemplary embodiment and second exemplary embodiment.

The pressure system 33 according to a fourth embodiment of the invention, as in FIG. 12 has, in principle, the same construction as the pressure system 33 of the third embodiment. However, flow can pass through in each case only between the first flow outlet opening 5.1 and the third flow outlet opening 5.3 and between the second flow outlet opening 5.2 and the fourth flow outlet opening 5.4. In other words, this means that the flow inlet openings 4.1, 4.2 are in each case connected, such that flow can pass through, to two flow outlet openings 5.1, 5.3; 5.2, 5.4, wherein the sets of flow outlet openings 5.1, 5.3; 5.2, 5.4 which are connected, such that flow can pass through, to in each case one of the flow inlet openings 4.1; 4.2 are formed such that flow cannot pass through between them.

In this fourth exemplary embodiment, the distributor pipe 3 has the flow inlet 4 with a first flow inlet opening 4.1 and a second flow inlet opening 4.2. The pressure system 33 according to the fourth embodiment constitutes a close approximation to an ideal symmetrical pressure system 33 due to the two flow inlet openings 4.1, 4.2, and leads to a further reduction in fuel consumption of the internal combustion engine 1.

Figure 13:
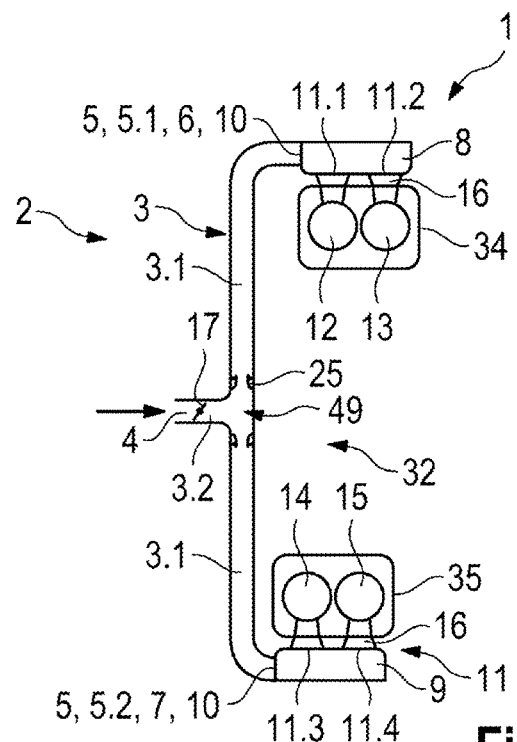
FIG. 13 is a schematic illustration of the internal combustion engine according to the invention with the pressure system according to the invention in a fifth exemplary embodiment.
Figure 14:
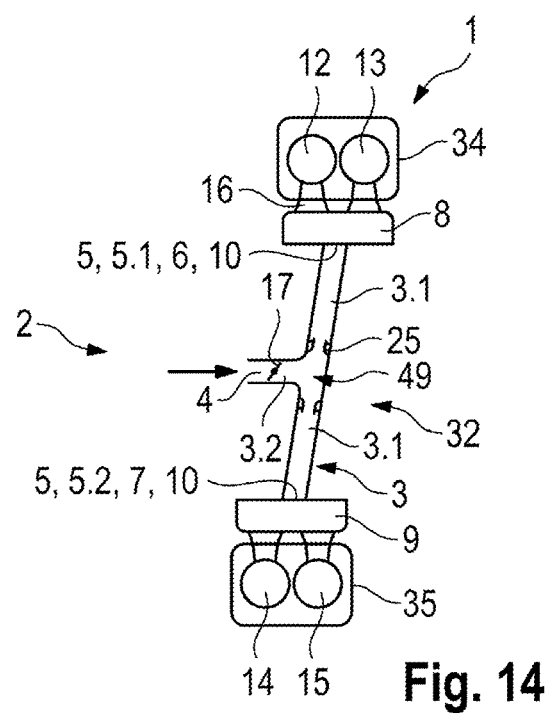
FIG. 14 is a schematic illustration of the internal combustion engine according to the invention with the pressure system according to the invention in a sixth exemplary embodiment.

The pressure systems 33 of the invention in a fifth and a sixth embodiment as in FIGS. 13 and 14 correspond to the pressure systems 33 of FIGS. 1 and 2. However, realize the advantages of the pressure system 33 according to the invention, the distributor pipe 3 has two guide elements 25 arranged between the flow inlet 4 and the flow outlet 5. It is thus possible, in relation to the prior art of FIGS. 1 and 2, for the great differences between the cylinder charges of the cylinders 12, 13, 14, 15 to be reduced, such that it is possible to realize operation of the internal combustion engine 1 under improved thermodynamic conditions, for example with optimized ignition time for the purposes of reducing the exhaust-gas temperature.

Figure 15:
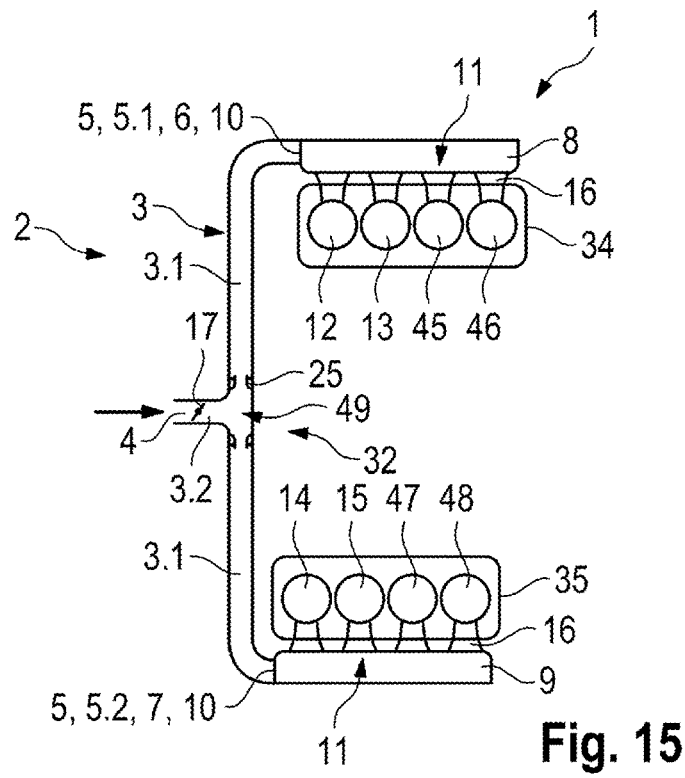
FIG. 15 is a schematic illustration of the internal combustion engine according to the invention with the pressure system according to the invention in a seventh exemplary embodiment.
Figure 16:
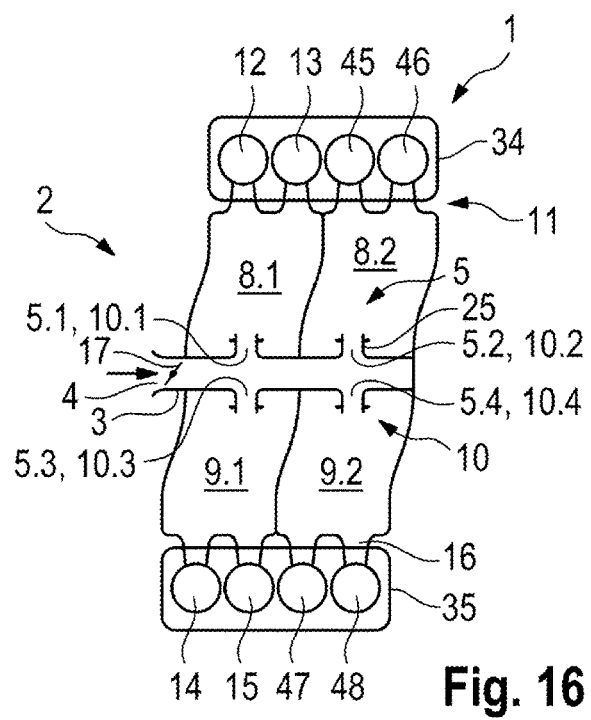
FIG. 16 is a schematic illustration of the internal combustion engine according to the invention with the pressure system according to the invention in a eighth exemplary embodiment.

In FIGS. 15 and 16, the internal combustion engine 1 of the invention has eight cylinders 12, 13, 14, 15, 45, 46, 47, 48, with each bank 34, 35 assigned four cylinders 12, 13, 45, 46; 14, 15, 47, 48. The pressure system 33 of the internal combustion engine 1 of the seventh embodiment of FIG. 15 is of the same design as the pressure system 33 of the fifth exemplary embodiment. The pressure system 33 of the internal combustion engine 1 of the eighth embodiment of FIG. 16 is of the same design as the pressure system 33 of the third embodiment. However, in each case one bank collector tank 8.1, 8.2, 8.3, 8.4 has two cylinders 12, 13; 14, 15; 45, 46, 47, 48.

Figure 17:
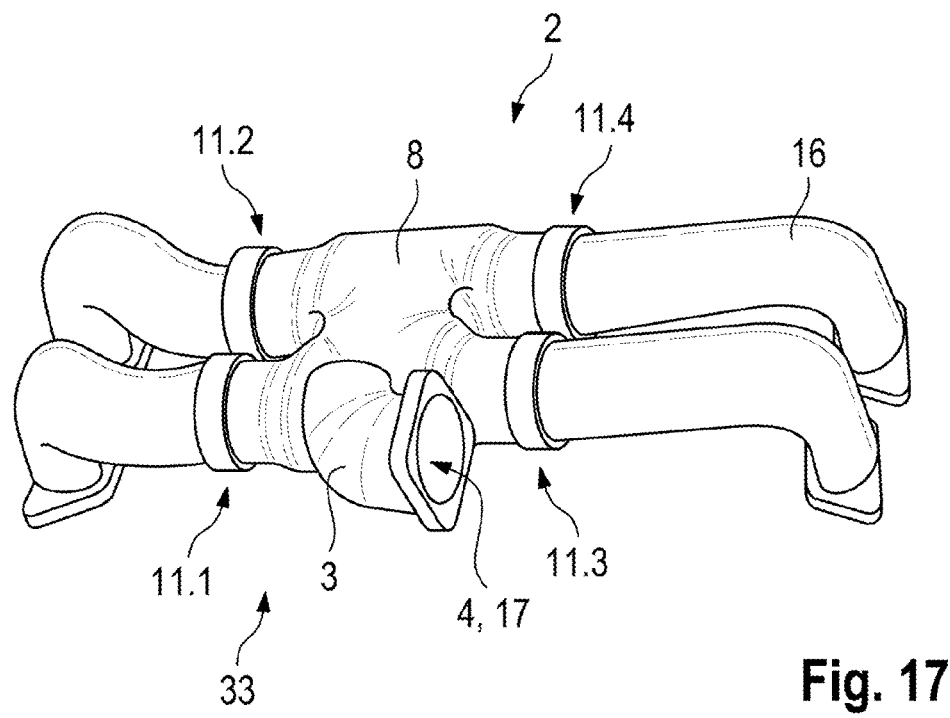
FIG. 17 shows, in a perspective illustration, the pressure system as per FIG. 3.
Figure 18:
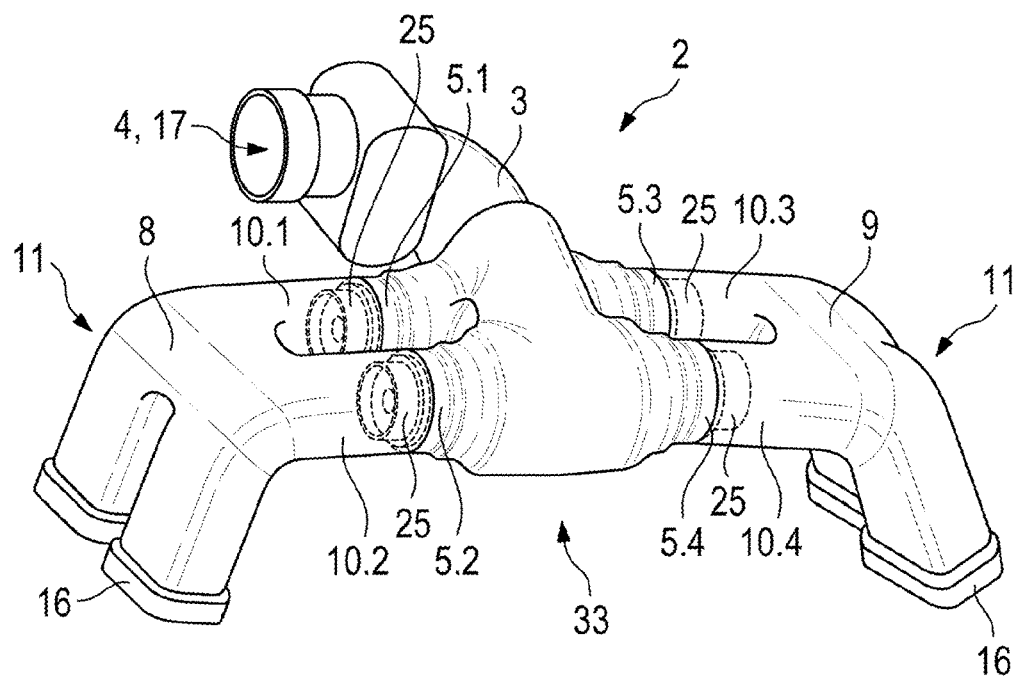
FIG. 18 shows, in a perspective illustration, the pressure system according to the invention as per FIG. 6.

FIGS. 17 and 18 respectively show the pressure system 33 of the intake tract 2 according to the prior art and the pressure system 33 according to the invention of the intake tract 2 of the internal combustion engine 1 according to the invention. The pressure system 33 according to the invention has four guide elements 25. The pressure system of FIG. 17 is, as illustrated in FIG. 3, designed so as to have long primary pipes 16. The pressure system of FIG. 18 is, as illustrated in principle in FIGS. 6 and 7, designed so as to have short primary pipes 16.

Figure 19:
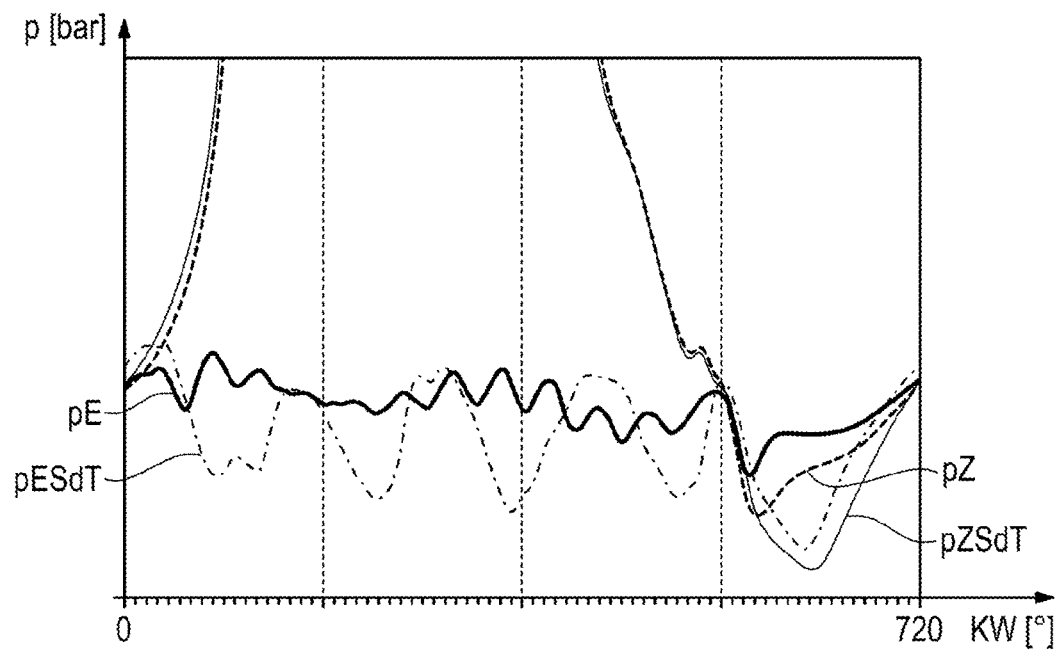
FIG. 19 shows, in a p-KW diagram, pressure profile curves over one working cycle of the internal combustion engine according to the prior art and of the internal combustion engine according to the invention.

FIG. 19 shows, in a p-KW diagram, that is to say a pressure-crank angle diagram, pressure profile curves pZSdT, pESdT in the first cylinder 12 or in an inlet duct of the first cylinder 12 over one working cycle of the internal combustion engine 1 of the prior art in comparison with the pressure profile curves pZ, pE in the first cylinder 12 or in the inlet duct of the first cylinder 12 of the internal combustion engine 1 of the invention at an engine speed n with a value of 5500 rpm.

Figure 20:
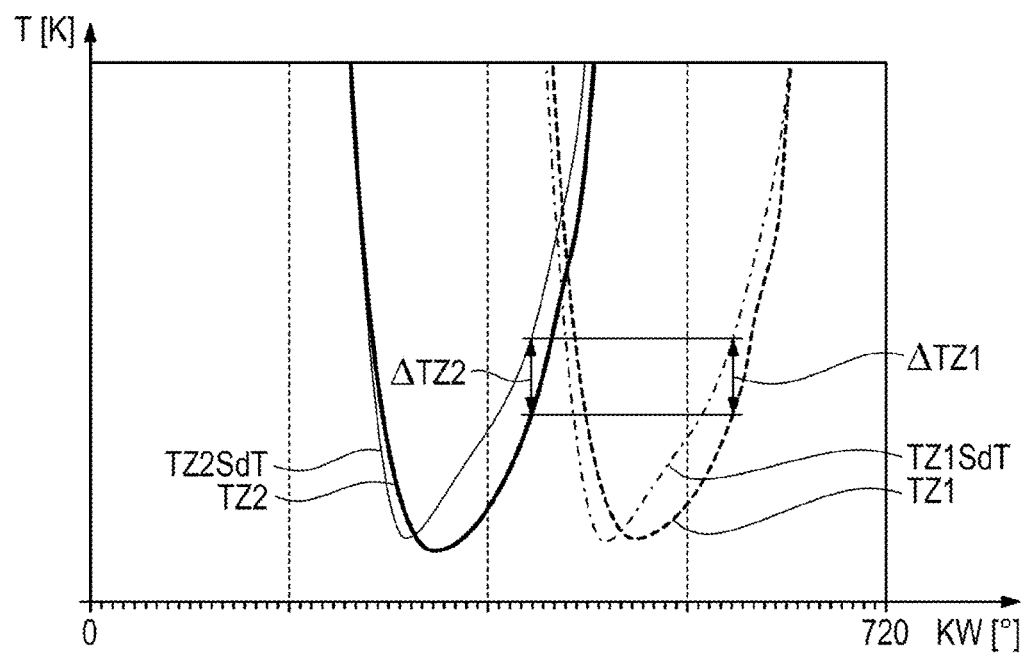
FIG. 20 shows, in a T-KW diagram, temperature profile curves during an inlet phase of the internal combustion engine according to the prior art and of the internal combustion engine according to the invention.

Furthermore, FIG. 20 illustrates, in a T-KW diagram, that is to say a temperature-crank angle diagram, temperature profile curves TZ1SdT, TZ1 and TZ2SdT, TZ2, associated with the pressure profile curves shown in FIG. 19, of the working cycle of the corresponding internal combustion engines 1, in particular of the inlet phase.

Toward the inlet end of the working cycle, the pressure increase of the internal combustion engine 1 according to the invention is smaller than the pressure increase of the internal combustion engine 1 according to the prior art, giving rise to a temperature reduction of the cylinder charge $\Delta TZ1$ in the first cylinder 12 and $\Delta TZ2$ in the second cylinder 13, respectively, of approximately 15 K. In this way, the knocking tendency is greatly reduced, and it is possible, in order to increase efficiency and reduce fuel consumption, for the ignition time to be adjusted in an advancing direction. TZ1 denotes the temperature in the first cylinder 12 and TZ2 denotes the temperature in the second cylinder 13 of the internal combustion engine 1 according to the invention, and TZ1SdT denotes the temperature in the first cylinder 12 and TZ2SdT denotes the temperature in the second cylinder 13 of the internal combustion engine 1 according to the prior art.

This means that, for the internal combustion engine 1 of the prior art and the internal combustion engine 1 of the invention, the same torque Md can be realized with a reduced fuel consumption in the case of the internal combustion engine 1 of the invention in relation to the fuel consumption be of the internal combustion engine 1 of the prior art. A positive secondary effect is the possibility of operating the compressor 19 of the internal combustion engine 1 of the invention with greater efficiency than the compressor 19 of the internal combustion engine 1 of the prior art.

A further advantage is the possibility of reducing the exhaust gas temperature of the internal combustion engine 1 according to the invention by way of an optimized ignition time adjusted in an advancing direction. This leads to the avoidance of an enrichment of the air-fuel mixture, such as is commonly used in the prior art for the purposes of protecting the turbine 20 of the internal combustion engine 1.

The reduction of the fuel consumption be of the internal combustion engine 1 according to the invention as per FIG. 6 in relation to the internal combustion engine 1 as per FIG.

Figure 21:
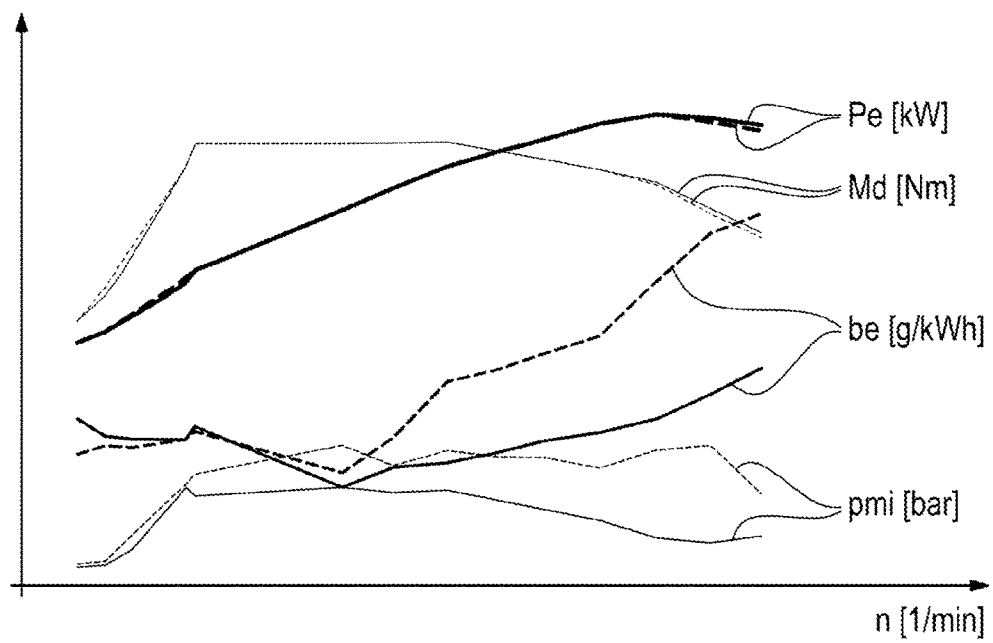
FIG. 21 shows, in a diagram, a specific fuel consumption, an indicated mean pressure, a torque and a power versus an engine speed of the internal combustion engine according to the prior art and of the internal combustion engine according to the invention.

3 can be seen from the diagram illustrated in FIG. 21. In said diagram, the fuel consumption be, an indicated mean pressure pmi, the torque Md and the power Pe are plotted alongside one another versus the engine speed n of the internal combustion engine 1 according to the prior art and of the internal combustion engine 1 according to the invention. Great reductions in consumption can be achieved in particular in the medium and high engine speed ranges. Furthermore, considerably improved running smoothness of the internal combustion engine 1 according to the invention is obtained. The dashed curves denote the corresponding values of the internal combustion engine 1 according to the prior art of FIG. 3, and the solid curves denote the values of the internal combustion engine 1 according to the invention of FIG. 6.

Figure 22:
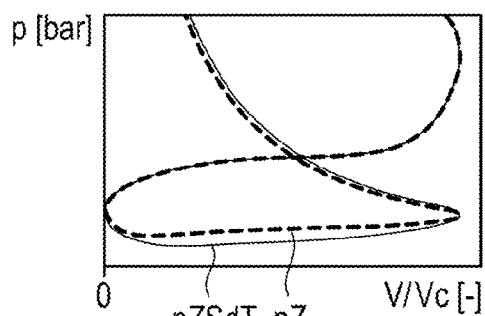
FIG. 22 shows, in a p-V/Vc diagram, a charge exchange phase of a cylinder pressure profile of the internal combustion engine according to the prior art and of the internal combustion engine according to the invention at a relatively high engine speed.
Figure 23:
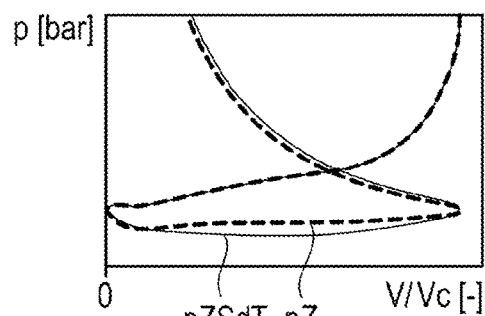
FIG. 23 shows, in a p-V/Vc diagram, a charge exchange phase of a cylinder pressure profile of the internal combustion engine according to the prior art and of the internal combustion engine according to the invention at a medium engine speed.

For further explanation, FIGS. 22 and 23, in each case in a p-V/Vc diagram, that is to say a pressure-volume diagram, wherein p denotes the pressure in the cylinder and V/Vc denotes a normalized cylinder volume of the internal combustion engine 1, illustrate the cylinder pressure pSdT or p of the first cylinder 12 in a charge-exchange phase of the internal combustion engine 1 as in FIG. 3 and of the internal combustion engine 1 according to the invention as in FIG. 6 at a relatively high engine speed and at a medium engine speed. The internal combustion engine 1 according to the invention exhibits a considerably reduced charge exchange loop.

LIST OF REFERENCE DESIGNATIONS

1 Internal combustion engine
2 Intake tract
3 Distributor pipe
3.1 First pipe section
3.2 Second pipe section
4 Flow inlet
4.1 First flow inlet opening
4.2 Second flow inlet opening
5 Flow outlet
5.1 First flow outlet opening
5.2 Second flow outlet opening
5.3 Third flow outlet opening
5.4 Fourth flow outlet opening
6 First end
7 Second end
8 First collector tank
8.1 First bank collector tank
8.2 Second bank collector tank
9 Second collector tank
9.1 Third bank collector tank
9.2 Fourth bank collector tank
10 Tank inlet
10.1 First tank inlet opening
10.2 Second tank inlet opening
10.3 Third tank inlet opening
10.4 Fourth tank inlet opening
11 Tank outlet
11.1 First tank outlet opening
11.2 Second tank outlet opening
11.3 Third tank outlet opening
11.4 Fourth tank outlet opening
12 First cylinder
13 Second cylinder
14 Third cylinder
15 Fourth cylinder
16 Primary pipe
17 Throttle flap
18 Supercharging unit
19 Compressor
20 Turbine
21 Exhaust tract
22 Charge-air cooler
23 Air filter
24 Exhaust-gas after treatment unit
25 Guide element
26 Longitudinal axis
27 Guide element inlet
28 Guide element outlet
29 Flow direction arrow
30 Support element
31 Outer edge
32 Interface
33 Pressure system
34 First bank
35 Second bank
36 Casing
37 Groove
38 Sealing element
39 Pipe collar
40 Element surface
41 Protuberance
42 Further support element
43 Element inner contour
44 Pipe inner contour
45 Fifth cylinder
46 Sixth cylinder
47 Seventh cylinder
48 Eighth cylinder
49 Branching point
DD Guide element outlet diameter
DE Guide element inlet diameter
DK Throttle flap diameter
E Element length
GL Total length
KW Crank angle
L Length
Md Torque
Pe Power
TZ1 Temperature of first cylinder
TZ2 Temperature of second cylinder
TZ1SdT Temperature of first cylinder, prior art
TZ2SdT Temperature of second cylinder, prior art
VD Distributor pipe diameter
V/Vc Normalized cylinder volume
be Specific fuel consumption
n Engine speed
p Pressure
pE Pressure profile curve, inlet duct
pESdT Pressure profile curve, inlet duct, prior art
pmi Indicated mean pressure
pZ Pressure profile curve, cylinder pressure
pZSdT Pressure profile curve, cylinder pressure, prior art
ΔTZ1 Temperature difference of first cylinder
ΔTZ2 Temperature difference of second cylinder
λa Volumetric efficiency

What is claimed is:
1. A guide element for a pressure system of an internal combustion engine, comprising a hollow body with a guide element inlet, a guide element outlet and a longitudinal axis, the guide element being configured so that a flow can pass through the hollow body along the longitudinal axis, the guide element being of streamlined form in a flow direction proceeding from the guide element inlet to the guide element outlet to eliminate disruptive oscillations, areas of the hol- low body adjacent the guide element outlet defining a cylindrical section having a guide element outlet diameter, an outwardly curved flared section extending along the hollow body from the cylindrical section to the guide element inlet, the guide element inlet having a guide element inlet diameter, the guide element outlet diameter has a value of at least 0.3 times the guide element inlet diameter and at most 0.5 times the guide element inlet diameter.

2. The guide element of claim 1, wherein the guide element is of non-streamlined form in a flow direction proceeding from the guide element outlet to the guide element inlet.

3. The guide element of claim 1, wherein the guide element is funnel-shaped.

4. The guide element of claim 1, wherein the guide element has an inlet diameter that is larger than an outlet diameter.

5. The guide element of claim 1, wherein the guide element has a support element for fastening in the pressure system.

6. The guide element of claim 5, wherein the support element extends radially away from the longitudinal axis from an outer edge formed on the guide element inlet.

7. The guide element of claim 5, wherein the support element is ring-shaped.

8. A pressure system for an intake tract of an internal combustion engine with a distributor pipe, through which flow can pass, the distributor pipe having a flow inlet and a flow outlet, a collector tank of the pressure system being arranged at the flow outlet, the collector tank having a tank inlet connected to the flow outlet and further having a tank outlet connected by way of a primary pipe of the pressure system so that flow can pass through to a cylinder of the internal combustion engine; and a guide element having a hollow body with a guide element inlet, a guide element outlet and a longitudinal axis, the guide element being configured so that a flow can pass through the hollow body along the longitudinal axis and being of streamlined form in a flow direction proceeding from the guide element inlet to the guide element outlet to eliminate disruptive oscillations, wherein the guide element is arranged at the flow outlet or between the flow inlet and the flow outlet of the distributor pipe, downstream of a branching point of the distributor pipe.

9. The pressure system of claim 8, wherein the guide element outlet of the guide element has a guide element outlet diameter that is smaller than a diameter at the flow inlet of the distributor pipe.

10. The pressure system of claim 9, wherein the guide element inlet diameter has a value of at least 0.213 times the diameter at the flow inlet of the distributor pipe and at most 0.355 times the diameter at the flow inlet of the distributor pipe.

11. The pressure system of claim 8, wherein a throttle flap with a throttle flap diameter is provided downstream of the flow inlet and upstream of the guide element, and wherein a guide element outlet of the guide element has a guide element outlet diameter (DD) that is smaller than the throttle flap diameter.

12. The pressure system of claim 11, wherein the guide element outlet diameter has a value of at least 0.3 times the throttle flap diameter and at most 0.5 times the throttle flap diameter.

13. The pressure system of claim 11, wherein the guide element inlet diameter has a value of at least 0.213 times the throttle flap diameter and at most 0.355 times the throttle flap diameter.

14. An internal combustion engine with a supercharging unit, having an intake tract with a first bank and a second bank, the first bank has at least two cylinders and the second bank has at least two further cylinders, and the intake tract having the pressure system of claim 8, wherein
the first collector tank is assigned to the first bank and the second collector tank is assigned to the second bank, the primary pipes being formed between the cylinders of the first bank and the first collector tank and between the further cylinders of the second bank and the second collector tank; and
the flow outlet of the distributor pipe of the pressure system has at least one flow outlet opening that is connected so that flow can pass through to the first collector tank, and said flow outlet has at least one further flow outlet opening connected so that flow can pass through to the second collector tank.

15. The internal combustion engine of claim 14, wherein the first collector tank has a first bank collector tank and a second bank collector tank, the first bank collector tank being connected so that flow can pass through to at least one cylinder of the first bank and the second bank collector tank being connected so that flow can pass through to at least one further cylinder of the first bank, and wherein the second collector tank has a third bank collector tank and a fourth bank collector tank, the third bank collector tank being connected so that flow can pass through to at least one cylinder of the second bank and the fourth bank collector tank being connected so that flow can pass through to at least one further cylinder of the second bank, the flow outlet of the distributor pipe having flow outlet openings assigned and connected so that flow can pass through to the respective bank collector tanks, and the guide elements being received respectively at the flow outlet openings, and the flow outlet openings being formed so that flow can pass through between them.

16. The internal combustion engine of claim 14, wherein the first collector tank has a first bank collector tank and a second bank collector tank, the first bank collector tank being connected so that flow can pass through to at least one cylinder of the first bank and the second bank collector tank being connected so that flow can pass through to at least one further cylinder of the first bank, and wherein the second collector tank has a third bank collector tank and a fourth bank collector tank, the third bank collector tank being connected so that flow can pass through to at least one cylinder of the second bank and the fourth bank collector tank being connected so that flow can pass through to at least one further cylinder of the second bank, the flow outlets of the distributor pipe each having one flow outlet opening connected so that flow can pass through to the bank collector tanks, wherein the guide element is received in each respective flow outlet opening, and the flow inlet of the distributor pipe has a first flow inlet opening and a second flow inlet opening, the flow inlet openings being connected respectively so that flow can pass through to two of the flow outlet openings, and wherein the sets of flow outlet openings are connected so that flow can pass through from the respective flow inlet openings but so that flow cannot pass through between them.

17. The internal combustion engine of claim 14, wherein the internal combustion engine is in the form of a V-configuration engine or in the form of a boxer engine.

18. The internal combustion engine of claim 14, wherein the pressure system is arranged at least partially between the first bank and the second bank.

19. The internal combustion engine of claim 14, wherein an exhaust tract of the internal combustion engine is arranged at least partially between the first bank and the second bank.

20. The internal combustion engine of claim 14, wherein the supercharging unit is an exhaust-gas turbocharger, a compressor of the exhaust-gas turbocharger being arranged in the intake tract and a turbine of the exhaust-gas turbocharger being arranged in an exhaust tract of the internal combustion engine.

21. The internal combustion engine of claim 14, wherein the supercharging unit has a mechanical compressor.

22. A pressure system for an intake tract of an internal combustion engine with a distributor pipe, through which flow can pass, the distributor pipe having a flow inlet and a flow outlet, a collector tank of the pressure system being arranged at the flow outlet, the collector tank having a tank inlet connected to the flow outlet and further having a tank outlet connected by way of a primary pipe of the pressure system so that flow can pass through to a cylinder of the internal combustion engine; and a guide element having a hollow body with a guide element inlet, a guide element outlet and a longitudinal axis, the guide element being configured so that a flow can pass through the hollow body along the longitudinal axis and being of streamlined form in a flow direction proceeding from the guide element inlet to the guide element outlet to eliminate disruptive oscillations, wherein the guide element outlet diameter has a value of at least 0.3 times the diameter at the flow inlet of the distributor pipe and at most 0.5 times the diameter at the flow inlet of the distributor pipe.

23. The pressure system of claim 22, wherein the guide element is arranged at the flow outlet or between the flow inlet and the flow outlet of the distributor pipe, downstream of a branching point of the distributor pipe.

* * * * *